(12) United States Patent
Anderson et al.

(10) Patent No.: US 11,517,106 B2
(45) Date of Patent: Dec. 6, 2022

(54) ADJUSTABLE TILT MECHANISM

(71) Applicant: Southco, Inc., Concordville, PA (US)

(72) Inventors: Glenn Eric Anderson, Malvern, PA (US); Richard E. Schlack, Newark, DE (US)

(73) Assignee: Southco, Inc., Concordville, PA (US)

( * ) Notice: Subject to any disclaimer, the term of this patent is extended or adjusted under 35 U.S.C. 154(b) by 130 days.

(21) Appl. No.: 16/341,155

(22) PCT Filed: Oct. 30, 2017

(86) PCT No.: PCT/US2017/058979
§ 371 (c)(1),
(2) Date: Apr. 11, 2019

(87) PCT Pub. No.: WO2018/081686
PCT Pub. Date: May 3, 2018

(65) Prior Publication Data
US 2020/0154882 A1    May 21, 2020

Related U.S. Application Data

(60) Provisional application No. 62/530,941, filed on Jul. 11, 2017, provisional application No. 62/415,021, filed on Oct. 31, 2016.

(51) Int. Cl.
*A47B 21/04*     (2006.01)
*F16M 11/10*    (2006.01)
(Continued)

(52) U.S. Cl.
CPC ............. *A47B 21/04* (2013.01); *F16M 11/10* (2013.01); *F16M 13/022* (2013.01); *B62B 5/00* (2013.01);
(Continued)

(58) Field of Classification Search
USPC .......... 248/123.11, 123.2, 162.1, 372.1, 395, 248/280.11, 292.11, 292.12, 292.13, 917,
(Continued)

(56) References Cited

U.S. PATENT DOCUMENTS 2,582,779 A    1/1952  Hoge
3,011,533 A  * 12/1961  Newman, Sr. ............ B27C 9/02
                                                               144/1.1
(Continued)

FOREIGN PATENT DOCUMENTS

CN    200973513 Y    11/2007
CN    101578060 A    11/2009
(Continued)

OTHER PUBLICATIONS

Chinese Office Action with Search Report for Chinese Application No. 201780081902.4, dated Oct. 12, 2020, 11 pages.
(Continued)

*Primary Examiner* — Alfred J Wujciak
(74) *Attorney, Agent, or Firm* — RatnerPrestia

(57) ABSTRACT

Aspects of the invention are directed to adjustable tilt mechanisms (30), e.g., adjustable tilt mechanisms configured for enabling objects to tilt around a tilting axis (101). According to one aspect of the invention, an adjustable tilt mechanism includes a housing (100) that defines a tilt axis and an adjustment axis (103) oriented perpendicular and non-intersecting relative to the tilt axis and a torque adjustment assembly that is at least partially disposed within the housing. The torque adjustment assembly (118) includes an adjuster (130) positioned for rotation about the adjustment axis defined by the housing, a gear (120) positioned for rotation about the tilt axis defined by the housing, and a
(Continued)

biasing spring (140) coupled to the gear. The gear being operatively coupled to the adjuster. The housing configured for coupling to an object.

14 Claims, 19 Drawing Sheets

(51) Int. Cl.
F16M 13/02 (2006.01)
B62B 5/00 (2006.01)
(52) U.S. Cl.
CPC ... F16M 2200/041 (2013.01); F16M 2200/06 (2013.01)
(58) Field of Classification Search
USPC .......................................... 248/919, 922, 923
See application file for complete search history.

(56) References Cited

U.S. PATENT DOCUMENTS

| | | | |
|---|---|---|---|
| 7,690,605 B2* | 4/2010 | Lee | F16M 11/10 248/133 |
| 7,891,631 B2* | 2/2011 | Lee | F16M 11/2021 248/371 |
| 8,161,890 B2 | 4/2012 | Wang | |
| 8,544,811 B2* | 10/2013 | Theis | F16M 11/18 248/372.1 |
| 9,277,812 B2 | 3/2016 | Bennet et al. | |
| 2005/0121578 A1* | 6/2005 | Asamarai | F16M 11/2064 248/284.1 |
| 2005/0225886 A1* | 10/2005 | Yamada | B60R 1/072 359/877 |
| 2008/0151483 A1 | 6/2008 | Holbrook et al. | |
| 2009/0031531 A1 | 2/2009 | Chang et al. | |
| 2010/0193647 A1 | 8/2010 | Huang et al. | |
| 2011/0194203 A1* | 8/2011 | Foote | B60R 1/072 359/876 |
| 2012/0006767 A1 | 1/2012 | Bennett et al. | |
| 2012/0154995 A1* | 6/2012 | Qiao | F16M 11/10 361/679.01 |
| 2015/0366180 A1* | 12/2015 | Chmura | F16M 11/18 248/514 |
| 2016/0037762 A1* | 2/2016 | Thomas | A01K 97/10 248/636 |
| 2017/0038046 A1* | 2/2017 | Bardot | F21V 21/30 |

FOREIGN PATENT DOCUMENTS

| | | |
|---|---|---|
| CN | 201891996 U | 7/2011 |
| CN | 105411184 A | 3/2016 |
| EP | 1921368 A2 | 5/2008 |
| EP | 2395730 A1 | 12/2011 |
| EP | 2580515 B1 | 4/2013 |
| JP | 2013534644 A | 9/2013 |
| WO | 9010818 A1 | 9/1990 |
| WO | 2012006593 A2 | 1/2012 |

OTHER PUBLICATIONS

International Preliminary Report on Patentability and Written Opinion for International Application No. PCT/US2017/058979, dated Apr. 30, 2019—10 pages.
International Search Report and Written Opinion for International Application No. PCT/EP2017/058979, dated Jan. 5, 2018—13 pages.
U.S. Appl. No. 62/304,617, dated Mar. 7, 2016—27 pages.
Japanese Notice of Reasons for Rejection for Japanese Application No. 2019-523703, dated Aug. 3, 2021, with translation, 14 pages.
Japanese Notice of Reasons for Rejection for Japanese Application No. 2019-523703, dated Mar. 8, 2022, with translation, 7 pages.

* cited by examiner

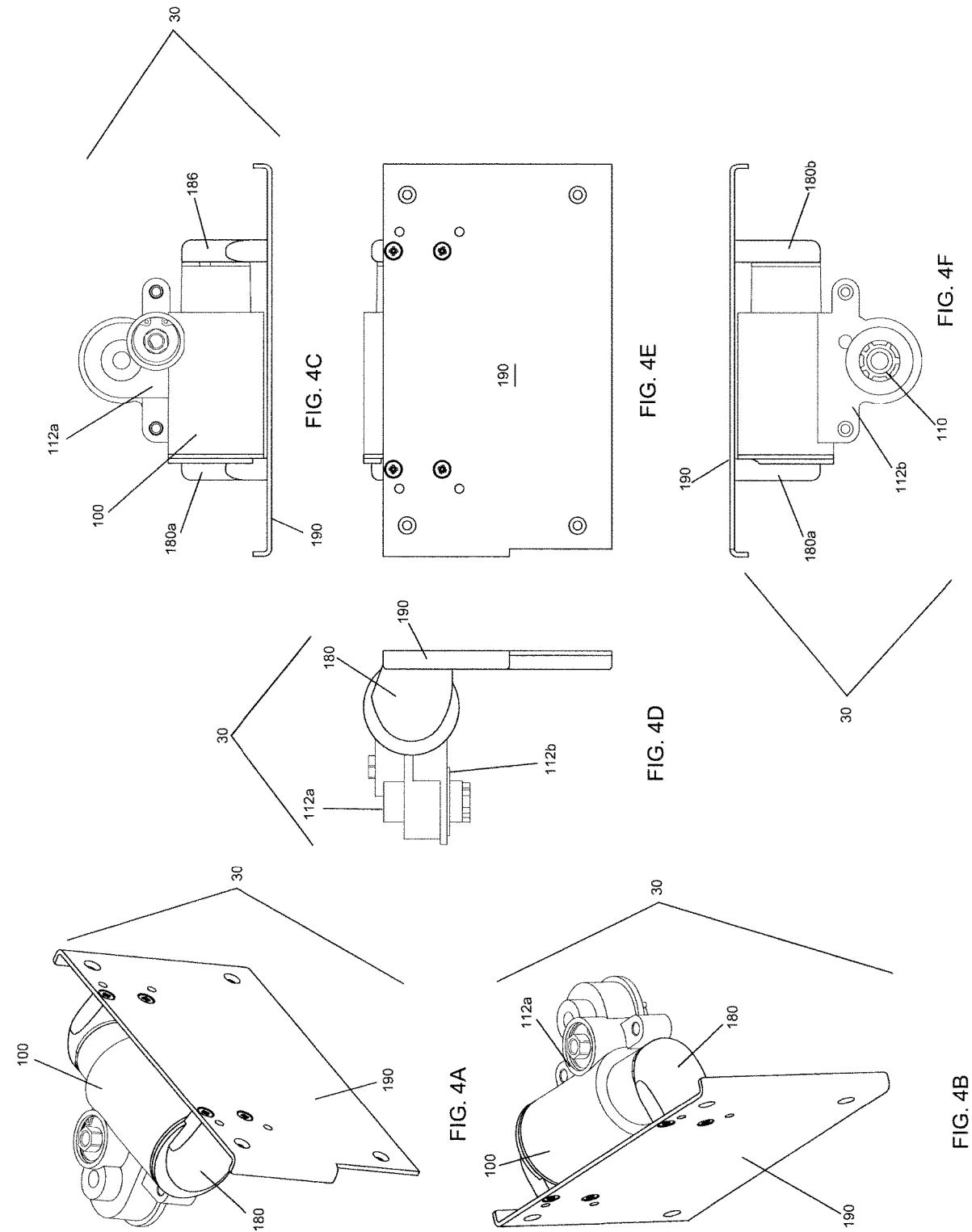

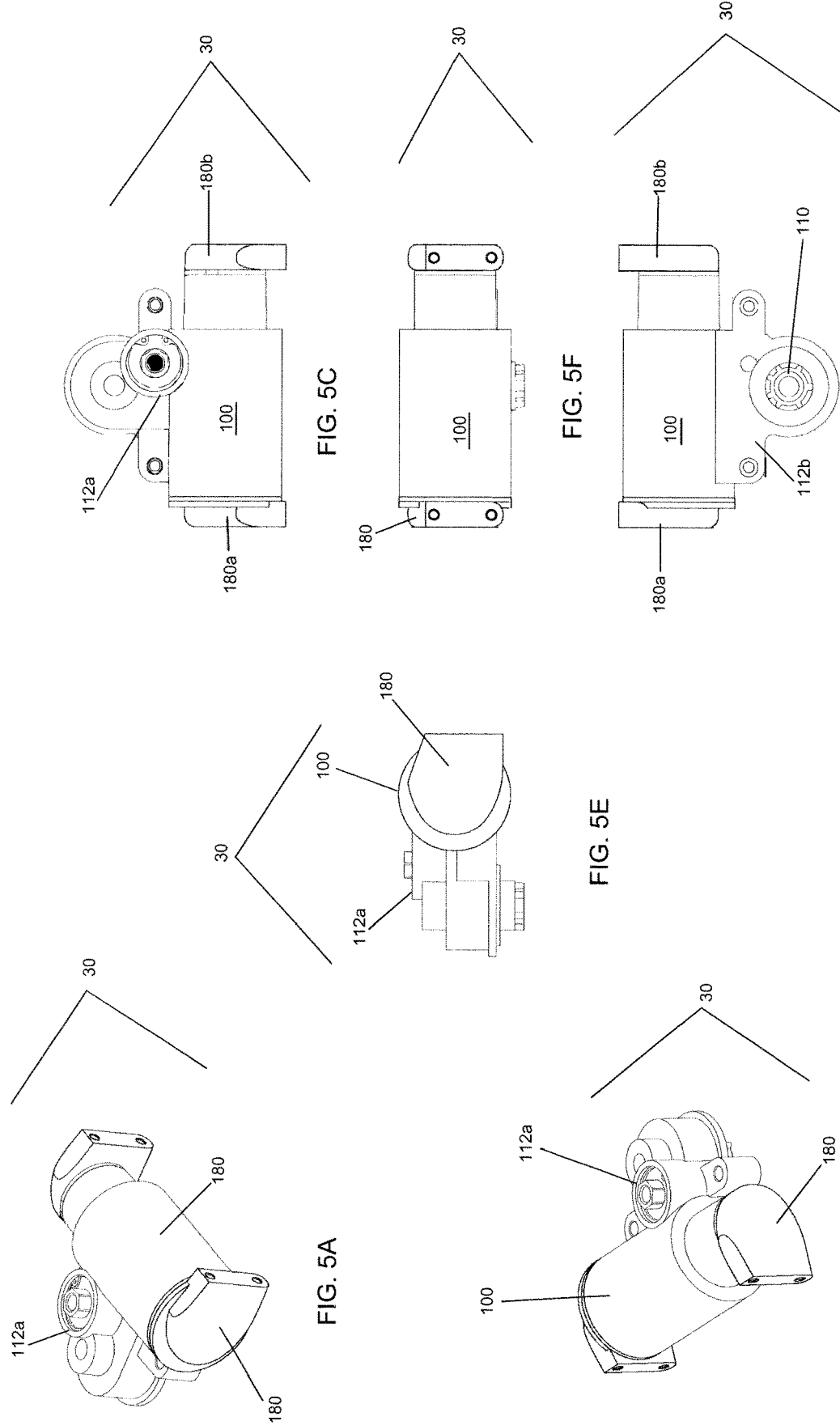

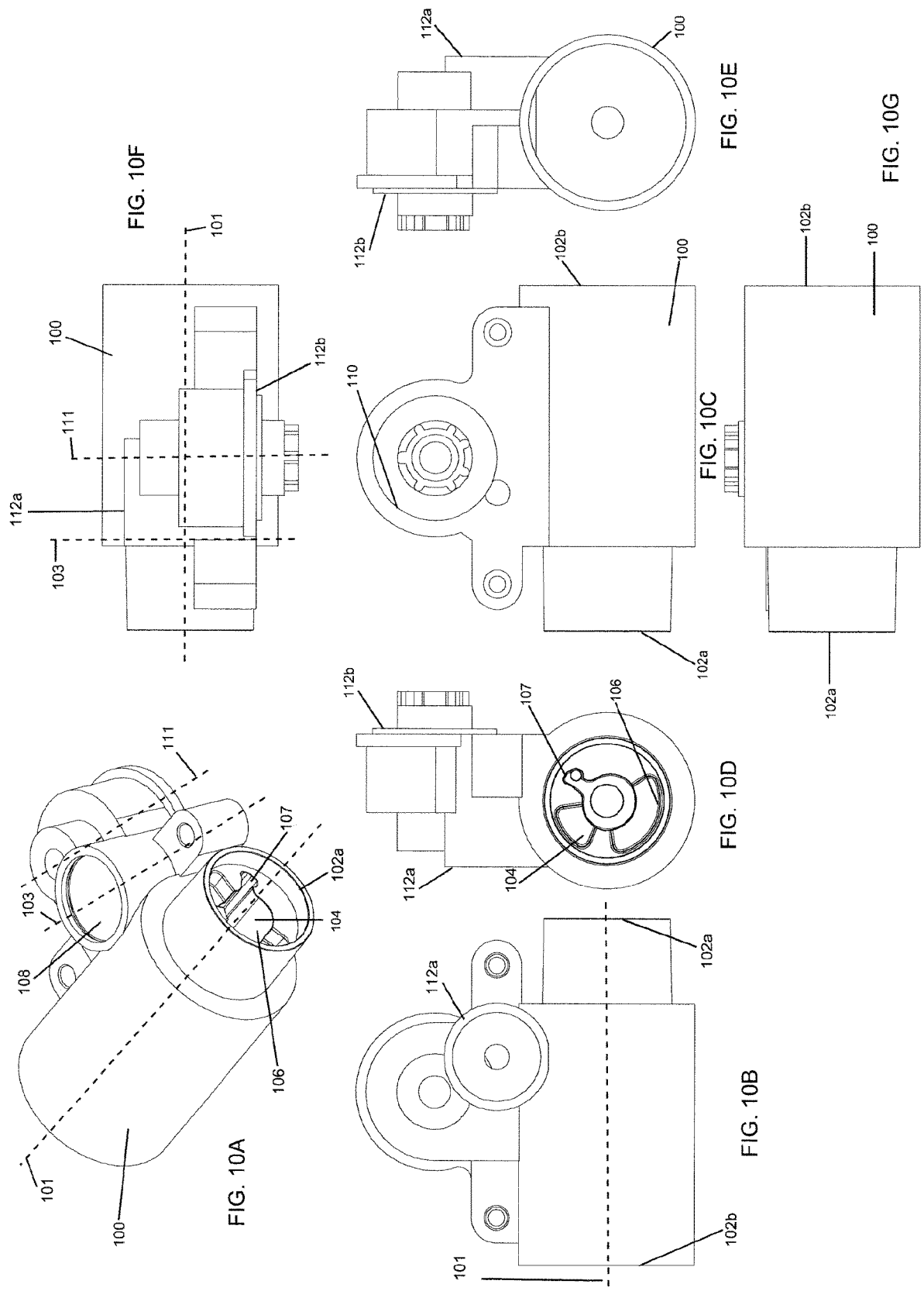

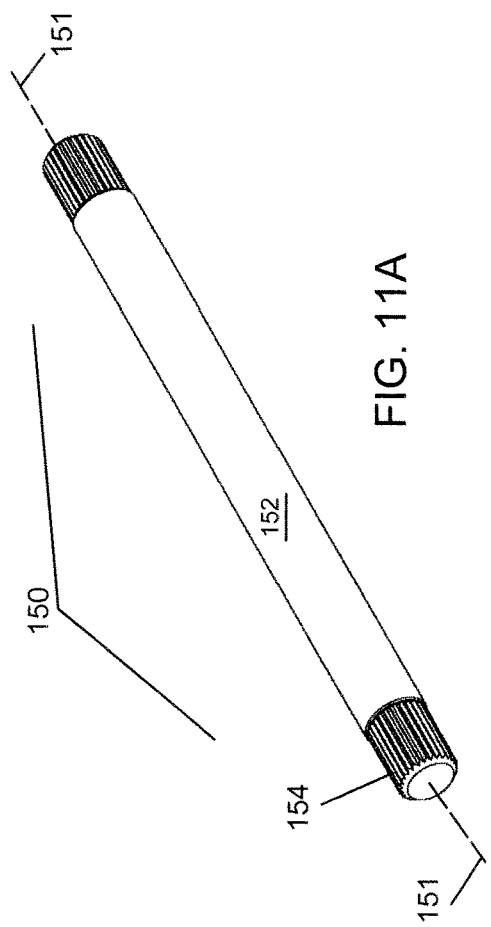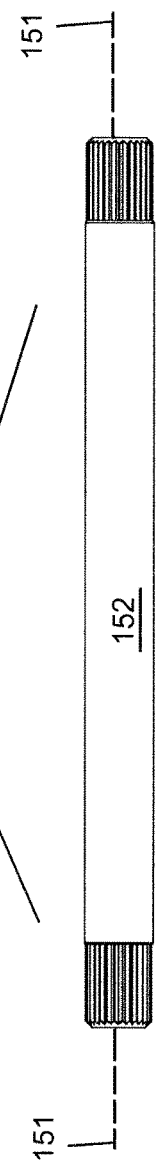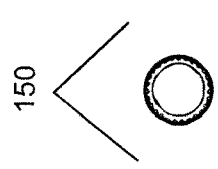

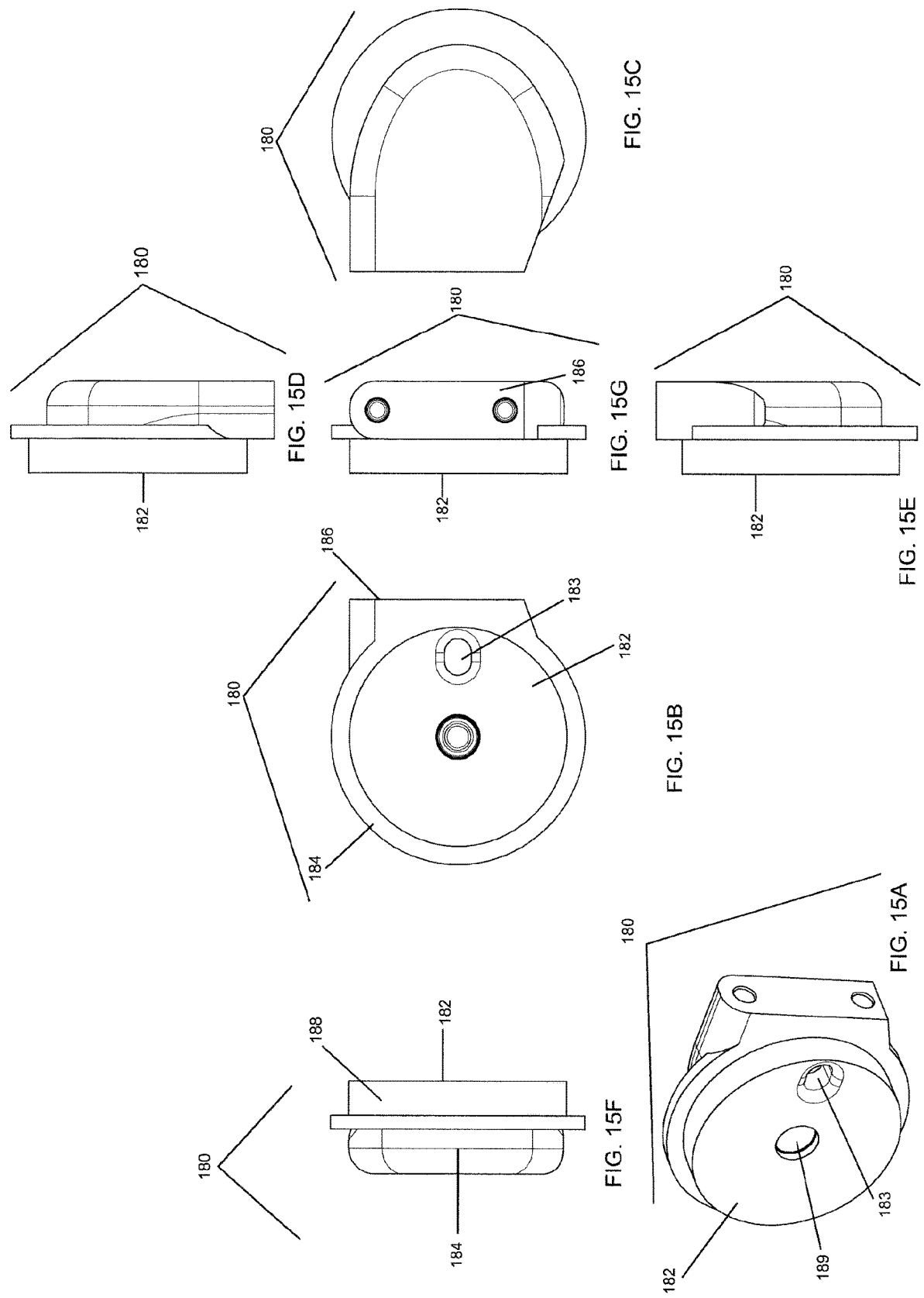

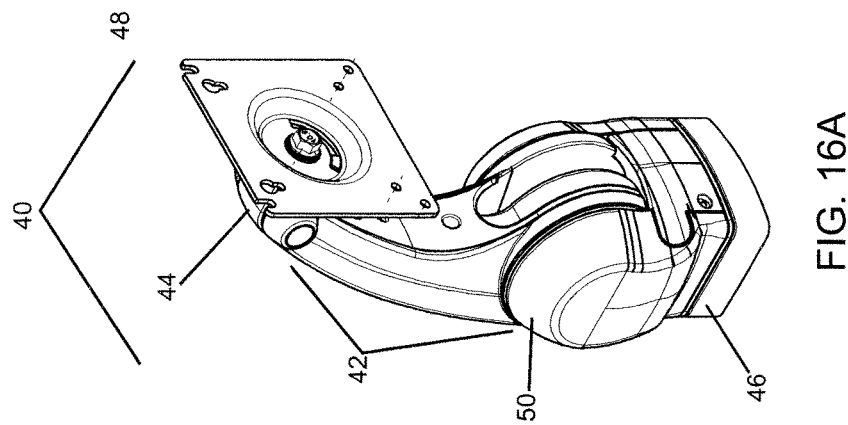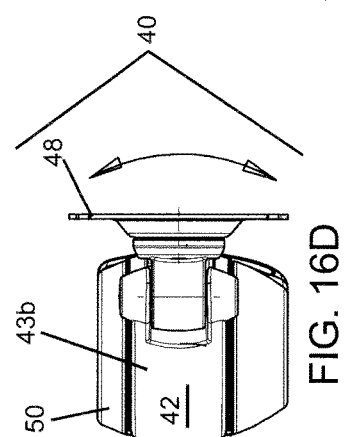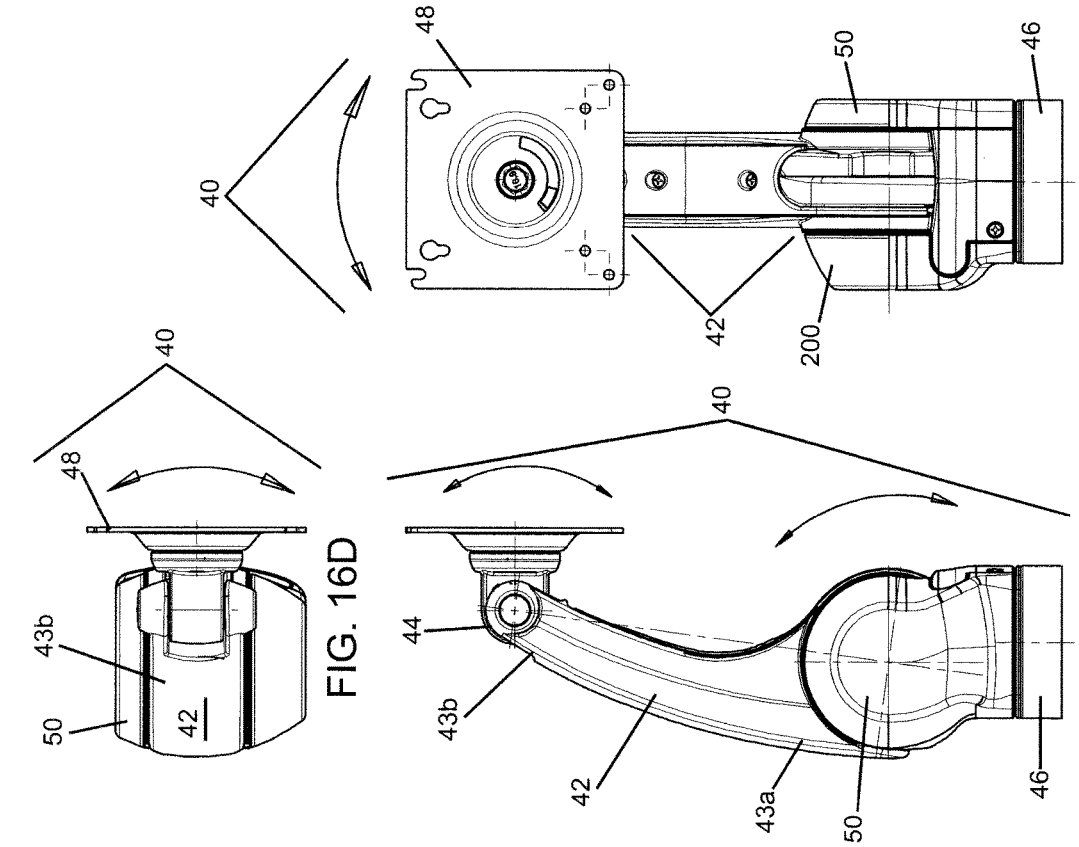

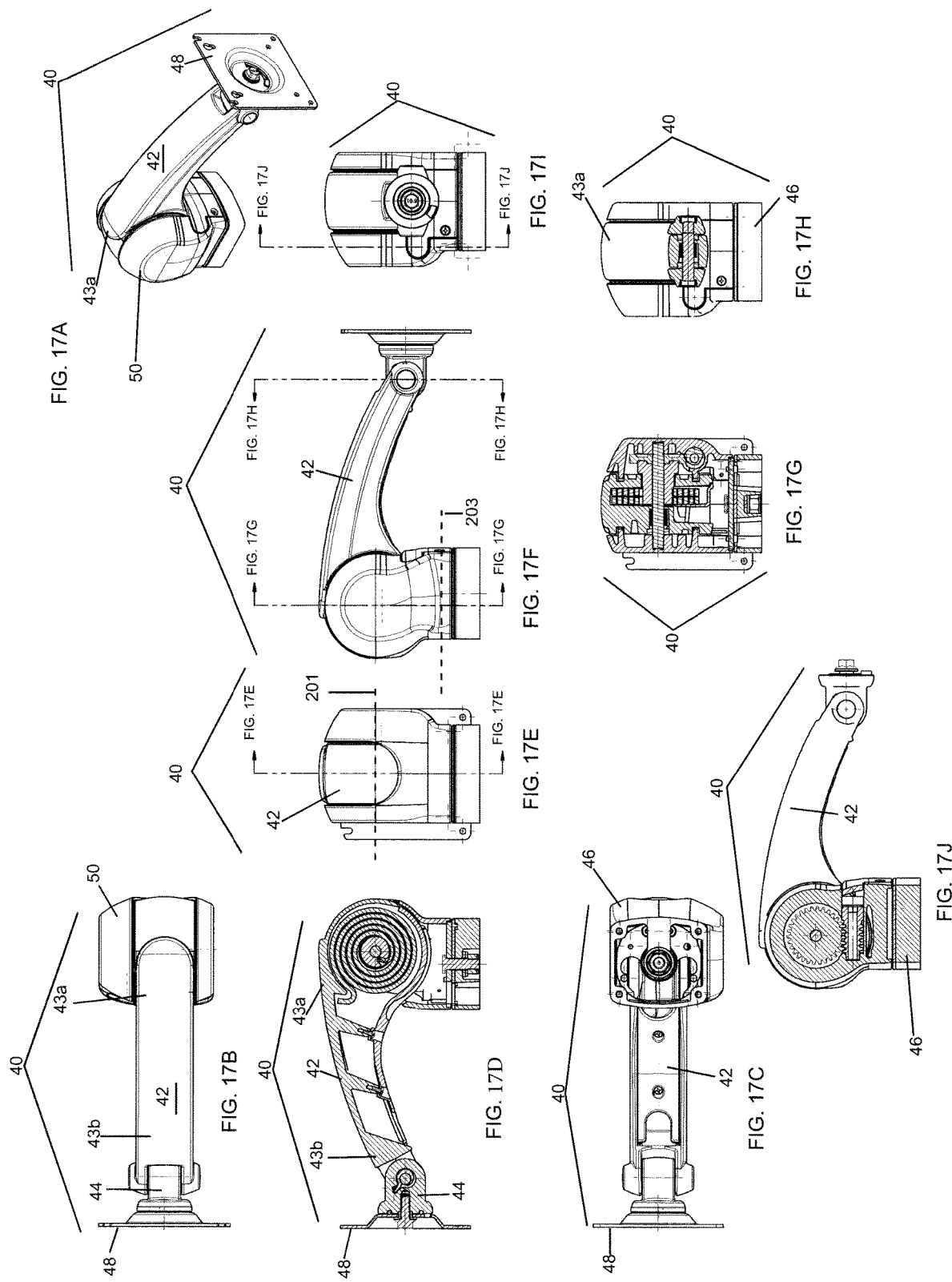

ADJUSTABLE TILT MECHANISM

This patent application is a U.S. National Phase Patent Application of PCT Application No.: PCT/US2017/058979, filed Oct. 30, 2017, which claims priority to U.S. Provisional Application Nos. 62/415,021 and 62/530,941, both entitled AN ADJUSTABLE TILT MECHANISM, filed on 31 Oct. 2016 and 11 Jul. 2017, the contents of which are incorporated herein by reference in their entirety for all purposes.

FIELD OF THE INVENTION

The present invention is directed to adjustable tilt mechanisms, e.g., adjustable tilt mechanisms configured for adjustably tilting a mounted object, and more specifically a user interface device and/or monitor.

BACKGROUND OF THE INVENTION

Display supporting apparatuses for supporting flat screen or flat panel displays have been disclosed in the prior art. For example, a display support arm assembly is disclosed in U.S. Pat. No. 9,277,812, which is incorporated herein by reference in its entirety for all purposes. However, there remains a need for improved adjustable tilting mechanisms for supporting a wide range of objects and/or user interface devices, which may be employed in, e.g., display support arm assemblies.

SUMMARY OF THE INVENTION

Aspects of the invention are directed to adjustable tilt mechanisms. According to one aspect of the invention, an adjustable tilt mechanism includes a housing that defines a tilt axis and an adjustment axis oriented perpendicular and non-intersecting relative to the tilt axis and a torque adjustment assembly that is at least partially disposed within the housing. The torque adjustment assembly includes an adjuster positioned for rotation about the adjustment axis defined by the housing, a gear positioned for rotation about the tilt axis defined by the housing, and a biasing spring coupled to the gear. The gear being operatively coupled to the adjuster. The housing coupled to at least one object.

According to another aspect of the invention, an arm assembly includes an arm having a longitudinal axis and an adjustable tilt mechanism coupled to the arm. The adjustable tilt mechanism includes a housing that defines a tilt axis and an adjustment axis oriented perpendicular and non-intersecting relative to the tilt axis and a torque adjustment assembly that is at least partially disposed within the housing. The torque adjustment assembly includes an adjuster positioned for rotation about the adjustment axis defined by the housing, a gear positioned for rotation about the tilt axis defined by the housing, and a biasing spring coupled to the gear. The gear being operatively coupled to the adjuster. The adjustable tilt mechanism further including at least one adaptor coupled to the housing. The arm assembly also includes a mounting plate coupled to the arm, the mounting plate being configured for supporting at least one mounted object.

According to a yet another aspect of the invention, a cart assembly includes a cart and an arm assembly extending from the cart. The arm assembly including an arm having a longitudinal axis and an adjustable tilt mechanism coupled to the arm. The adjustable tilt mechanism includes a housing that defines a tilt axis and an adjustment axis oriented perpendicular and non-intersecting relative to the tilt axis and a torque adjustment assembly that is at least partially disposed within the housing. The torque adjustment assembly includes an adjuster positioned for rotation about the adjustment axis defined by the housing, a gear positioned for rotation about the tilt axis defined by the housing, and a biasing spring coupled to the gear. The gear being operatively coupled to the adjuster. The adjustable tilt mechanism further including at least one adaptor coupled to the housing and a mounting plate coupled to the arm. The mounting plate being configured for supporting at least one mounted object.

BRIEF DESCRIPTION OF THE DRAWINGS

The invention is best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be dropped. This emphasizes that according to common practice, the various features of the drawings are not drawn to scale unless otherwise indicated. On the contrary, the dimensions of the various features may be expanded or reduced for clarity. Included in the drawings are the following figures:

FIGS. 4A-4F are perspective, front, top, and side views of an adjustable tilt mechanism connected to a mounting plate according to aspects of the invention;

FIGS. 5A-5F are perspective, top, bottom, and side views of the adjustable tilt mechanism of FIG. 4A;

FIGS. 10A-10G are perspective, top, bottom, and side views of the housing of the adjustable tilt mechanism of FIG. 7;

FIGS. 11A-11C are perspective, top, and side views of the pin of the adjustable tilt mechanism of FIG. 7;

FIGS. 15A-15G are perspective, side, top, and bottom views of the adaptor of the adjustable tilt mechanism of FIG. 7;

FIGS. 16A-16F are perspective, front, side, back, and cross-sectional views of another embodiment of an arm assembly in accordance with aspects of the invention;

FIGS. 17A-17C are perspective, top, and bottom views of the arm assembly in a down position of FIGS. 16A-16E;

FIGS. 17D-17E are back and cross-sectional views of the arm assembly in a down position of FIGS. 16A-16E;

FIGS. 17F-17H are side and cross-sectional views of the arm assembly in a down position of FIGS. 16A-16E;

FIGS. 17I and 17J are front and cross-sectional views of the arm assembly in a down position of FIGS. 16A-16E;

DETAILED DESCRIPTION OF EMBODIMENTS OF THE INVENTION

Figure 1:
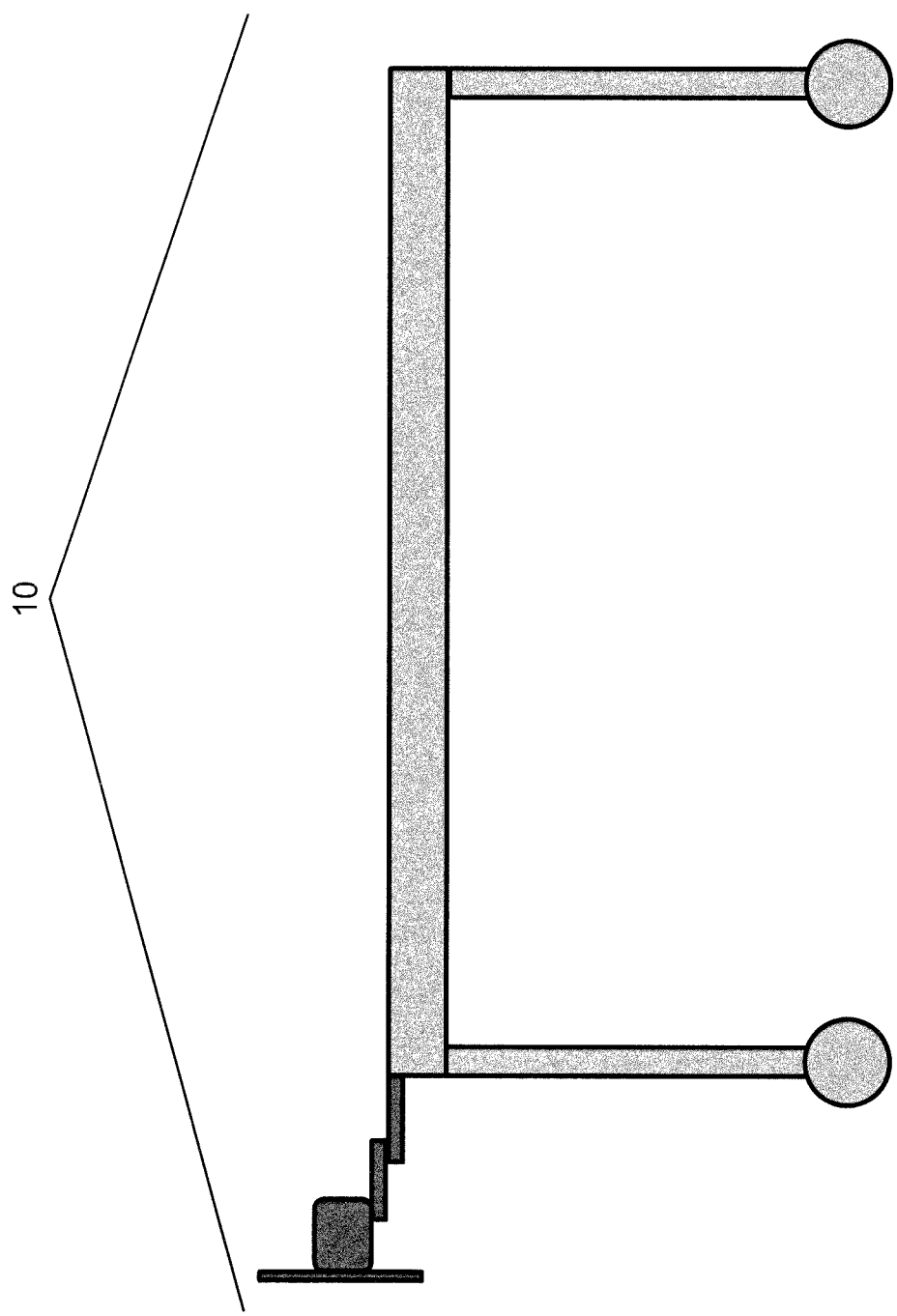
FIG. 1 is a schematic side view of a cart having an articulating arm in accordance with aspects of the invention.

Aspects of the invention are directed to adjustable tilt mechanisms capable of enabling desired positioning by a user. For example, the adjustable tilt mechanism may advantageously allow a user to modify the load and/or torsional force applied by the adjustable tilt mechanism after assembly to achieve a desired positioning and/or stability of an object relative to the adjustable tilt mechanism. In another aspect of the invention, the adjustable tilt mechanism is incorporated into an articulating arm for desirably positioning a mounted object (e.g., a display). Yet, in an additional aspect of the invention, it is contemplated that a cart assembly may be configured to include one or more arm assemblies having adjustable tilt mechanisms for positioning objects in desirable positions with respect to the cart.

In an embodiment of the invention, an adjustable tilt mechanism 30 includes a housing 100 that defines a tilt axis 101 and an adjustment axis 103 oriented perpendicular and non-intersecting relative to the tilt axis 101 and a torque adjustment assembly 118 that is at least partially disposed within the housing 100. The torque adjustment assembly 118 includes an adjuster 130 positioned for rotation about the adjustment axis 103 defined by the housing 100, a gear 120 positioned for rotation about the tilt axis 101 defined by the housing 100, and a biasing spring 140 coupled to the gear 120. The gear 120 being operatively coupled to the adjuster 130. The adjustable tilt mechanism 118 further including at least one adaptor 180 coupled to the housing 100 and configured for coupling the housing 100 to a mounting plate 190.

FIG. 1 illustrates an embodiment of a cart 10 configured for supporting objects. Cart 10 may be configured for mobility by having one or more wheels, sliders, or the like. Although cart 10 may be adapted to support one or more objects (e.g., a user interface device, monitor, etc.) for medical use, cart 10 may be configured in other embodiments for supporting industrial, commercial, or personal objects, such as equipment, tools, displays, monitors, keyboards, etc. Cart 10 may support one or more objects by having an arm assembly, e.g., arm assembly 20, coupled to a surface or internal portion of cart 10. The arm assembly coupled to cart 10 may be designed to include one or more aspects of the invention, which are discussed herein.

Figure 3:
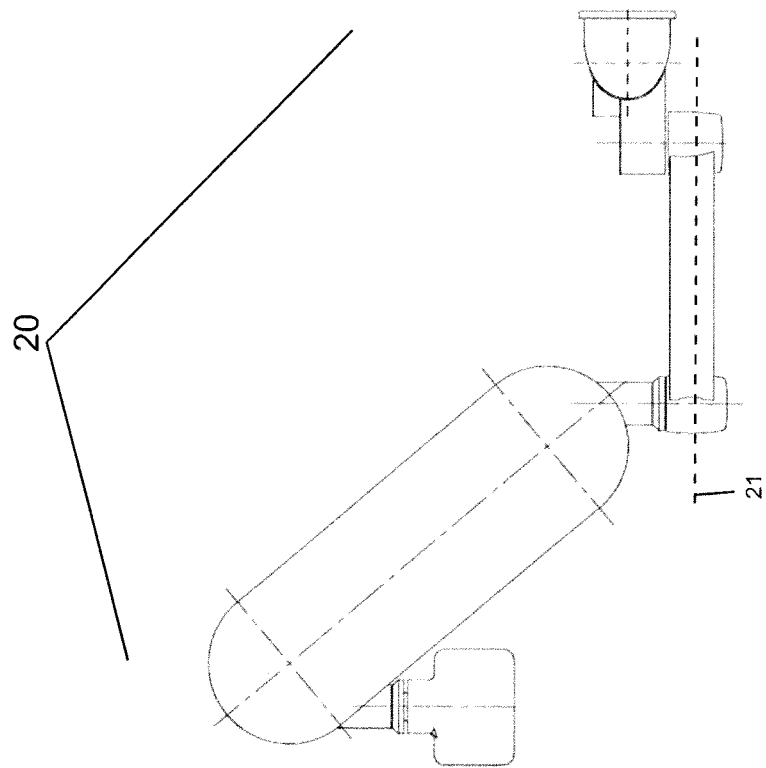
FIG. 3 is a side view of the articulating arm of FIG. 2.
Figure 2:
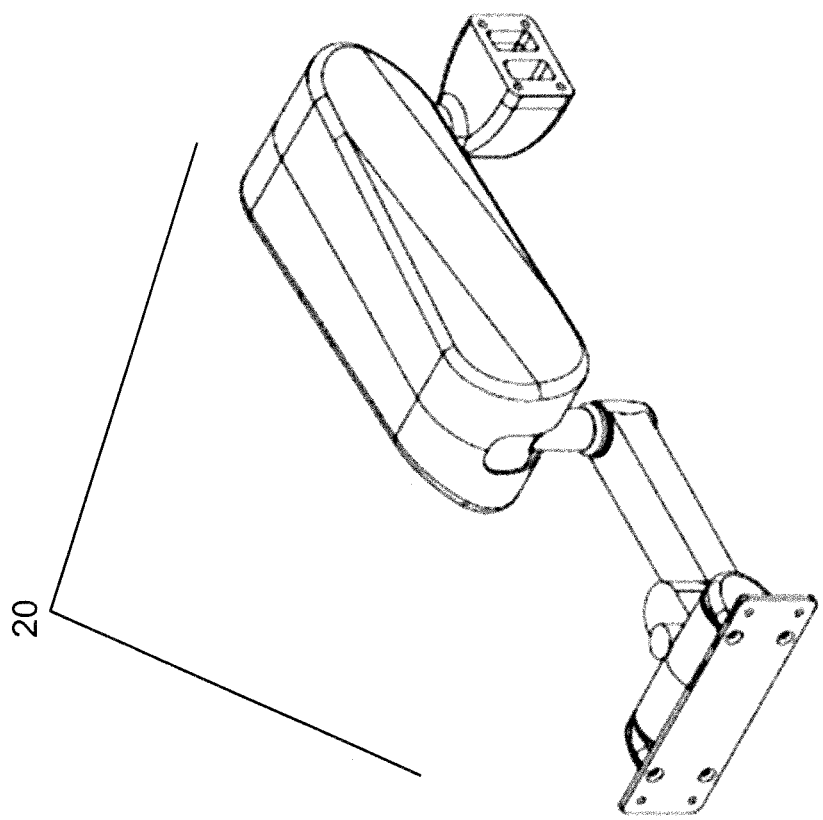
FIG. 2 is a perspective view of an embodiment of an articulating arm according to aspects of the invention.
Figure 6C:
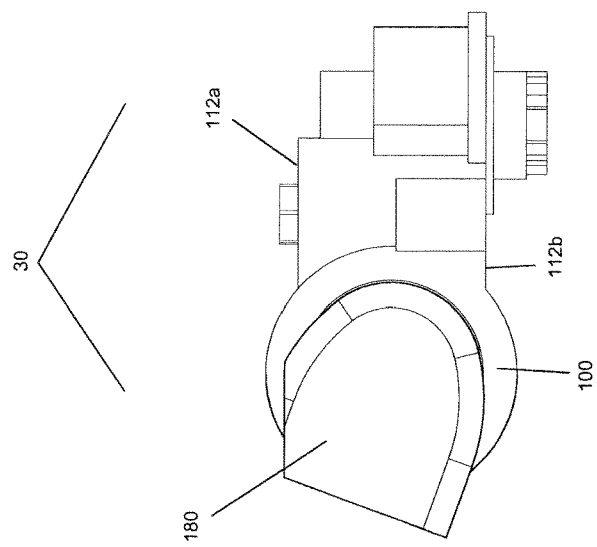
FIGS. 6A-6C are side views of the adjustable tilt mechanism of FIG. 4A in an upward tilting position, horizontal tilting position, and a downward tilting position.
Figure 6B:
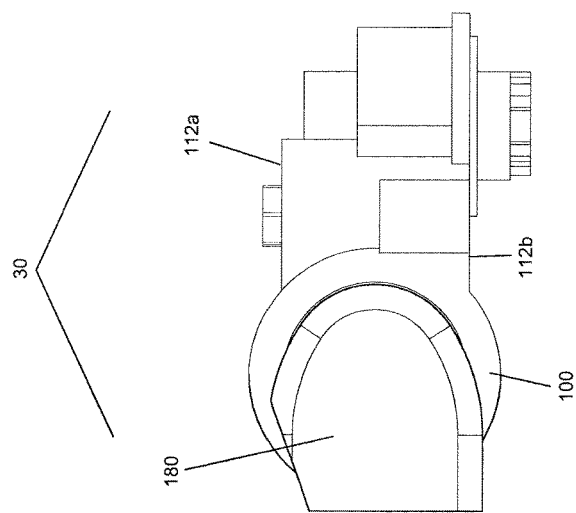
Figure 6A:
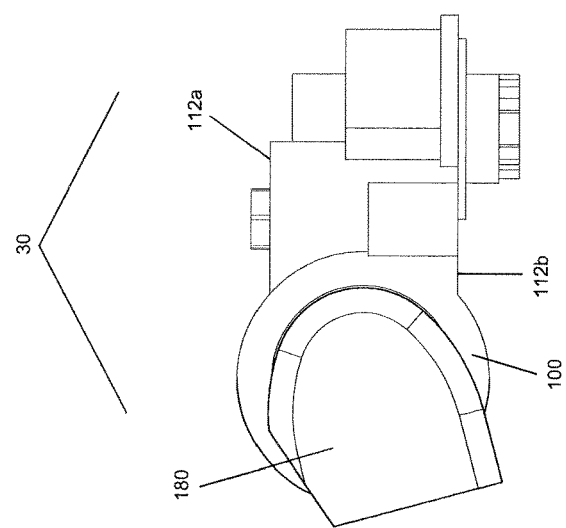

FIGS. 2 and 3 illustrate exemplary, non-limiting arm assemblies, and portions thereof, in accordance with aspects of the invention. Arm assembly 20 has a longitudinal axis 21. Arm assembly 20 may be configured to include a four bar arrangement, at least one gas strut, one or more rotational swivels/studs, and a support mounting portion configured for coupling to an object (e.g., cart 10, a wall, a table, a ceiling, etc.). Arm assembly 20 may include one or more components or features of the display support arm assemblies disclosed in U.S. Pat. No. 9,277,812 and U.S. Provisional Application No. 62/304,617, which are incorporated herein by reference in their entirety for all purposes.

FIGS. 5A-5F illustrate a non-limiting, exemplary adjustable tilt mechanism, and portions thereof, in accordance with aspects of the invention. As a general overview, adjustable tilt mechanism 30 includes a housing 100, a torque adjustment assembly 118, and at least one adaptor 180.

Figure 8C:
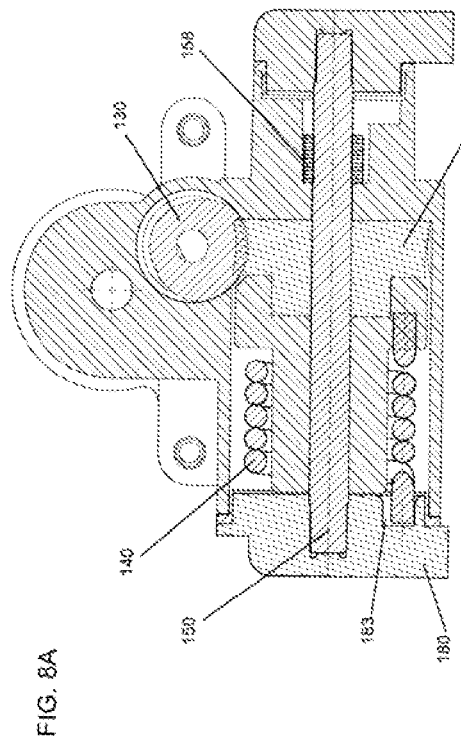
FIGS. 8A-8C are cross-sectional views of the adjustable tilt mechanism of FIG. 7.
Figure 7:
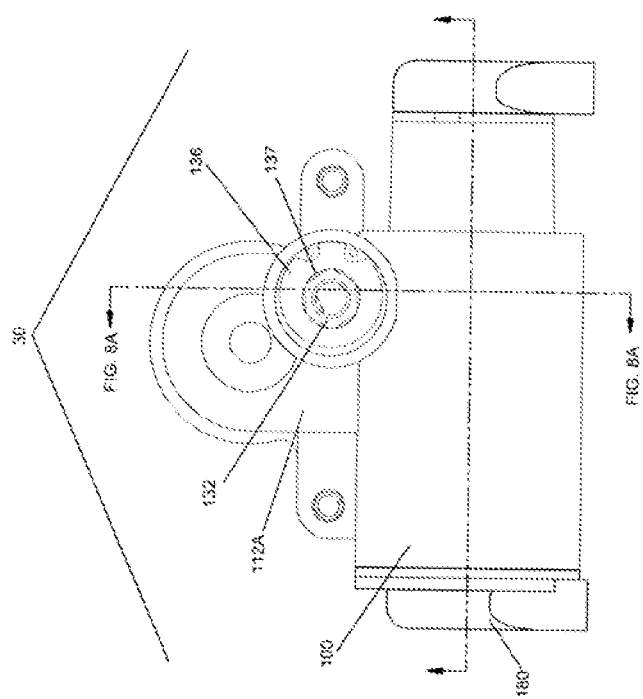
FIG. 7 is a top view of the adjustable tilt mechanism of FIG. 4A.

Referring to FIGS. 7-8C, adjustable tilting mechanism 30 includes a housing 100 defining a tilt axis 101 and an adjustment axis 103. Adjustment axis 103 is oriented perpendicular and non-intersecting relative to tilt axis 101. It is contemplated that adjustment axis 103 may be oriented substantially perpendicular and non-intersecting relative to tilt axis 101 so as to be within a reasonable degree of error and/or such that the torque adjustment assembly (e.g., torque adjustment assembly 118) is operable as further discussed below. In one embodiment, however, adjustment axis 103 is oriented perpendicular and non-intersecting relative to tilt axis 101. In the embodiment, tilt axis 101 is substantially horizontally oriented, while adjustment axis 103 is substantially vertically oriented.

Figure 16F:
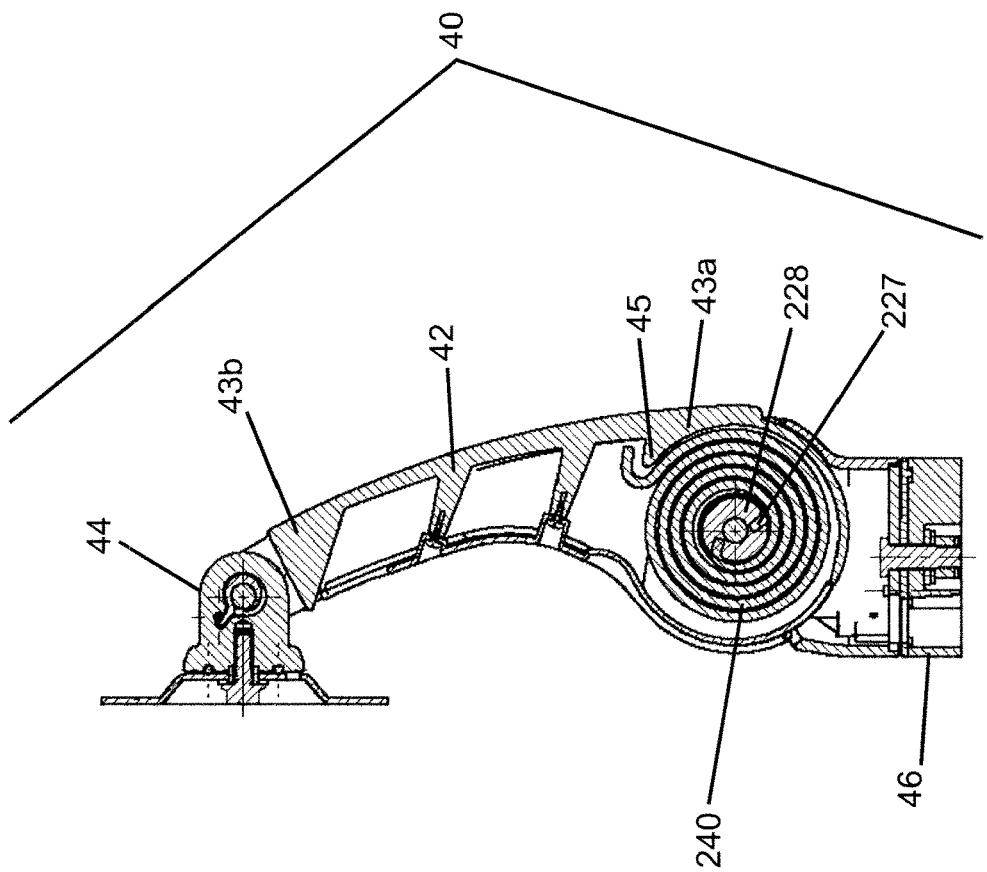
Figure 16E:
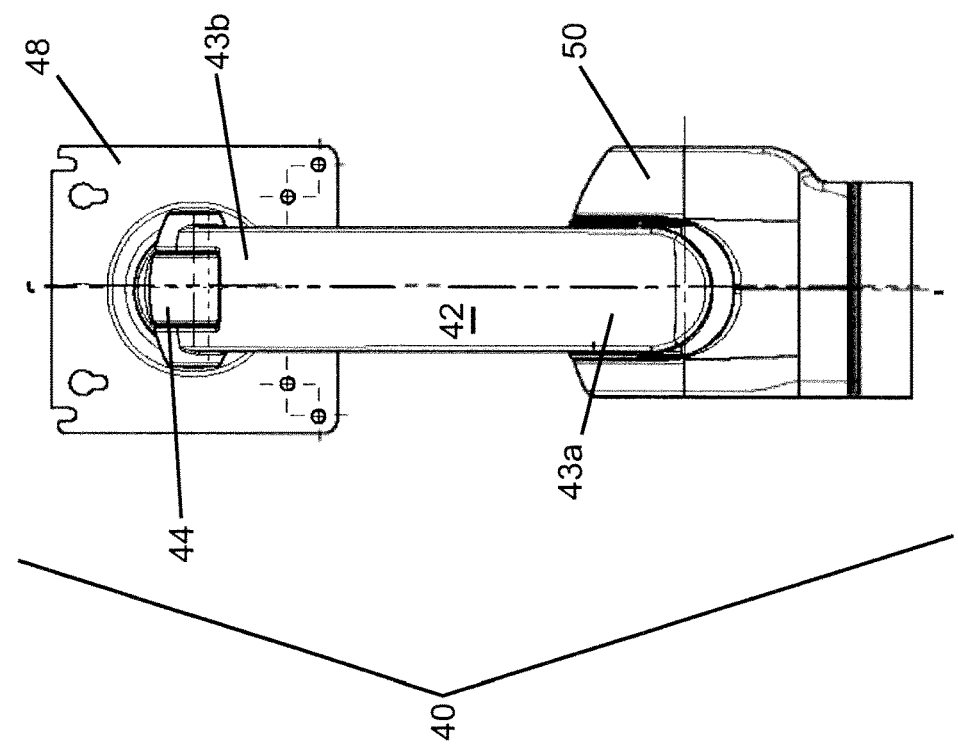

Referring to 10A-10G, housing 100 delineates a tilting receptacle 104 extending along tilt axis 101, e.g., from one side 102a of housing 100 to an opposed side 102b of housing 100. For example, housing 100 may have an inner surface 106 extending from side 102a to 102b, which delineates tilting receptacle 104. Inner surface 106 may be formed of one or more surfaces and/or may include protrusions and/or detents. As illustrated in FIGS. 10A and 10D, in one embodiment, inner surface 106 includes a groove configured for securing one or more components disposed at least partially within housing 100, e.g., such as groove 107 being configured to rotationally secure at least one toque element 158. In another embodiment illustrated in FIGS. 16A-177, tilting receptacle 104 extends through and/or may be defined by housing 200 and an end portion of arm 42.

Housing 100 may also delineate an adjustment receptacle 108 extending along adjustment axis 103, which extends, e.g., from a bottom surface 112b of the housing to a top surface 112a of housing 100 or from a top surface 112a of housing 100 to an internal portion of housing 100. Adjustment receptacle 108 is in communication with tilting receptacle 104 by way of aperture 109. It will be appreciated that references to "top," "bottom," or other directionally relations are used for convenience with reference to the orientation of the embodiments as illustrated in the figures, and not to delineate strict and exclusive positional relationships. In other words, the apparatus illustrated in the figures may be oriented in various positions.

Housing 100 may further define a rotation receptacle 110 extending along a rotation axis 111 for receiving a swivel. Preferably, rotation receptacle 110 does not extend through housing 100, but extends from a top surface 112a or a bottom surface 112b to a terminal surface of rotational receptacle 110 within housing 100. In one embodiment, however, the rotation receptacle extends through the housing 100, e.g., from a top surface 112a to a bottom surface 112b of housing 100. Rotational receptacle 110 may receive the swivel to rotatable couple adjustable tilt mechanism 30 to a coupled object, e.g., such as arm assembly 20.

Referring to FIGS. 4A-4F and FIGS. 15A-15G, the adjustable tilting mechanism 30 includes at least one an adaptor 180 configured for coupling housing 100 to a mounting plate 190. Adaptor 180 includes a body portion 184 having a coupling surface 186 and a support portion 188 disposed within tilting receptacle 104 of housing 100. In the embodiment illustrated in FIG. 15G, coupling surface 186 defines two threaded holes for receiving a screw for affixing mounting plate 190 to adaptor 180. Support portion 188 extends from body portion 184 to inner surface 182. In one embodiment, inner surface 182 defines holder 183 for receiving a biasing spring (e.g., an end 142 of biasing spring 140).

Figure 8A:
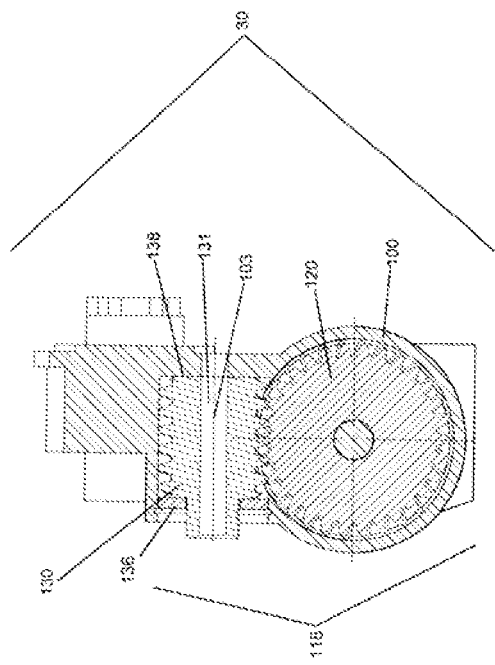
Figure 8B:
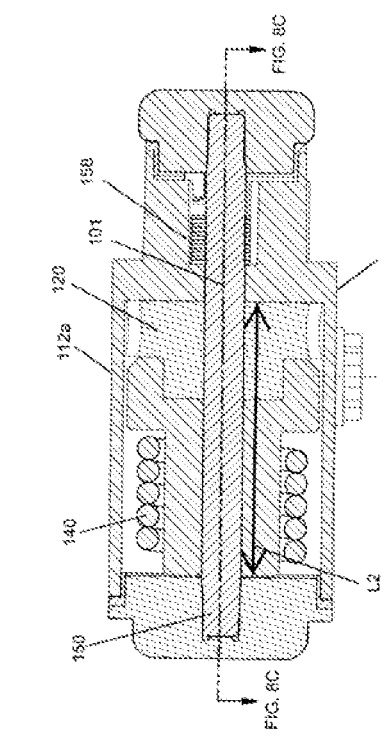
Figure 9A:
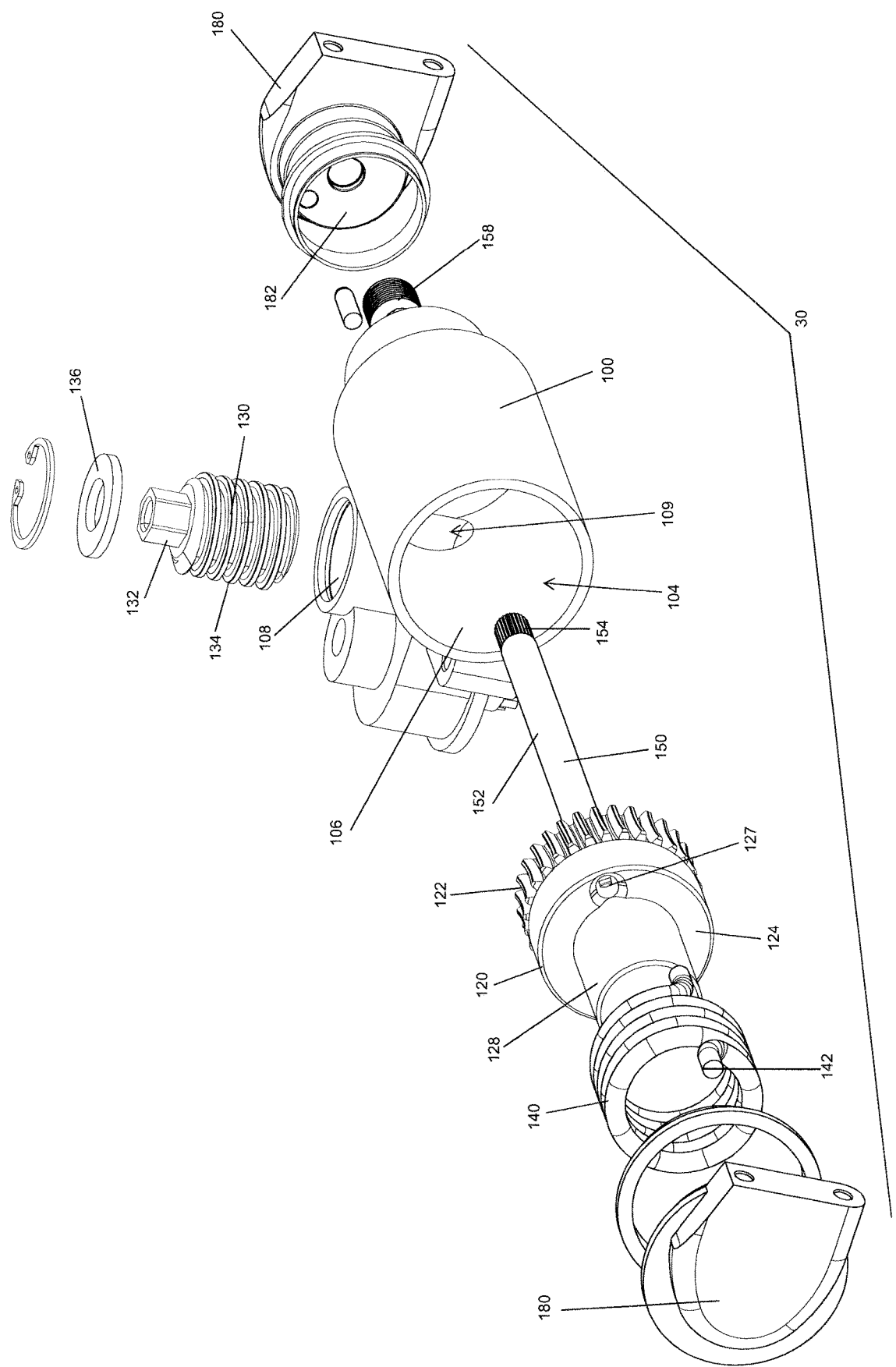
FIGS. 9A and 9B are exploded views of the adjustable tilt mechanism of FIG. 7.
Figure 9B:
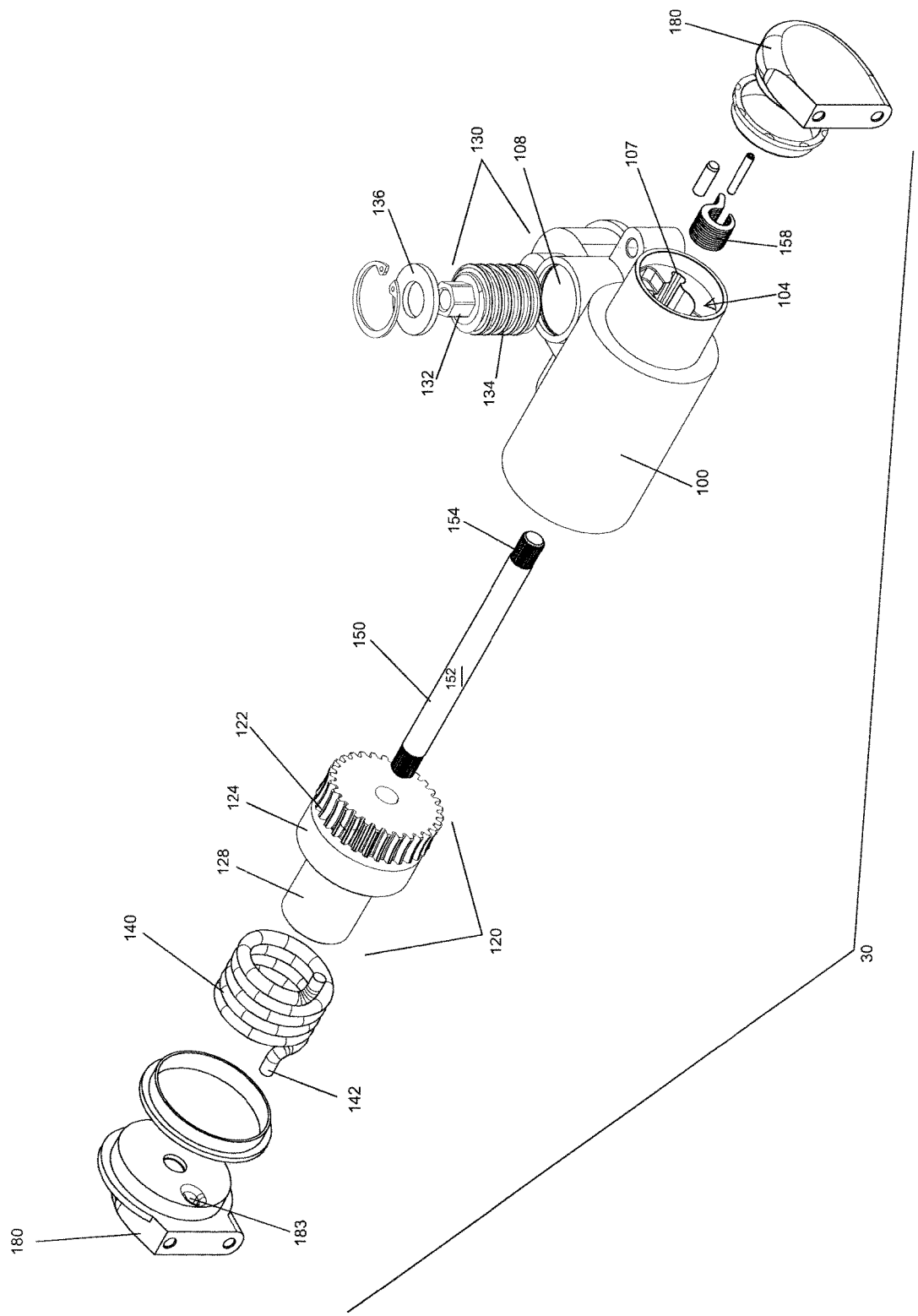
Figure 12C:
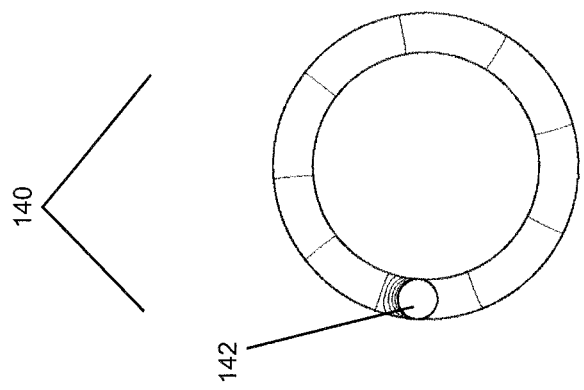
FIGS. 12A-12C are perspective, top, and side views of the biasing spring of the adjustable tilt mechanism of FIG. 7.
Figure 12B:
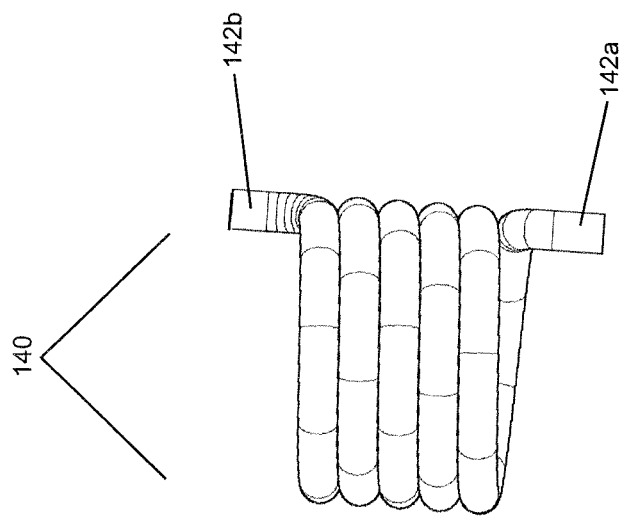
Figure 12A:
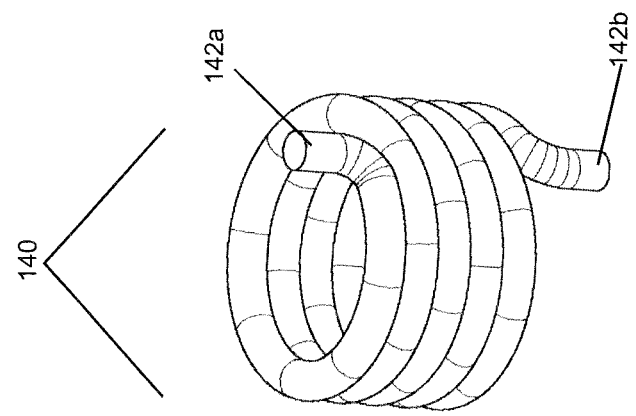

Referring to FIGS. 7-8C, the adjustable tilting mechanism 30 includes torque adjustment assembly 118 that is at least partially disposed within housing 100. Torque adjustment assembly 118 includes a gear 120, an adjuster 130, and a biasing spring 140. In the embodiment illustrated in FIGS. 8A-8C, gear 120 and biasing spring 140 of torque adjustment assembly 118 are supported in housing 100 by pin 150, which extends through tilting receptacle 104.

Referring to the embodiment illustrated in FIG. 11A-11C, pin 150 has an outer surface 152 extending along axis 151, which forms a cylindrical shape. Preferably, pin 150 is positioned within tilting receptacle 104, such that axis 151 of pin 150 is coaxial with respect to tilt axis 101 of housing 100. Pin 150 may be coupled to at least one adaptor 180. Outer surface 152 of pin 150 may have one or more grooved portions 154 and/or one or more smooth portions 156. The grooved portions 154 are adapted to rotationally secure pin 150 to another component of adjustable tilt mechanism 30, such as adaptor 180. For example, in the illustrated embodiment, pin 150 is coupled at one end portion to a first adaptor 180a and coupled at a second end portion to a second adaptor 180b, such that rotation or tilt adjustment of adaptor 180 rotates pin 150. Grooved portion 154 may rotationally secure pin 150 relative to adaptor 180 by, e.g., forming pockets for adhesives, facilitating crimping, deforming to produce a frictional seal, etc. In one embodiment, grooved portion 154 may correspond to grooves in tilting holder 189 of adaptor 180. Pin 150 may support gear 120 with respect to housing 100, e.g., by coupling to adaptors 180a and/or 180b and being disposed at least partially through a passageway extending along an axis of gear 120. In one embodiment, gear 120 and pin 150 are coaxial with respect to tilt axis 101 of housing 100.

Figure 18A:
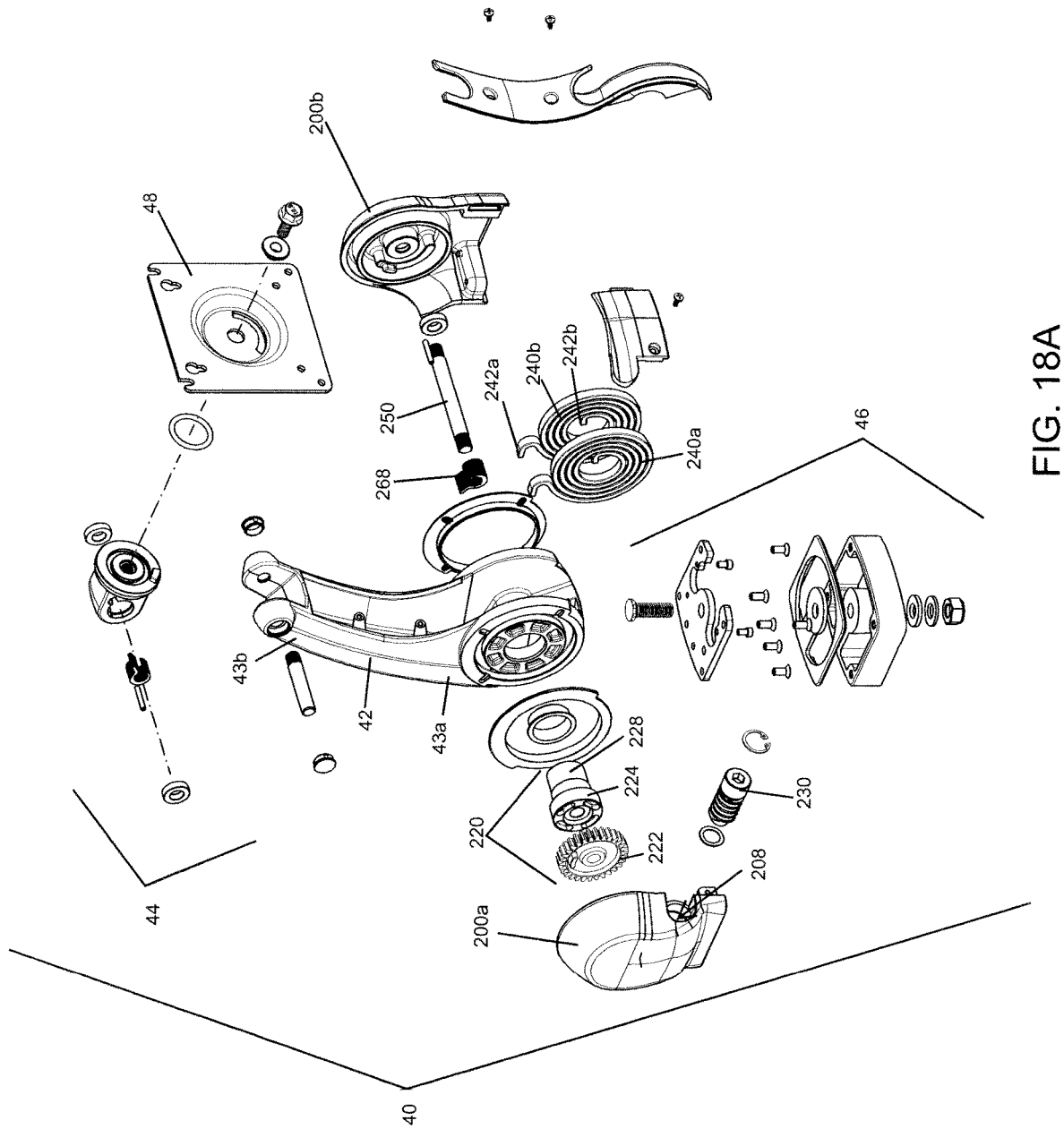
FIG. 18A is an exploded view of the arm assembly of FIGS. 16A-16E.
Figure 18B:
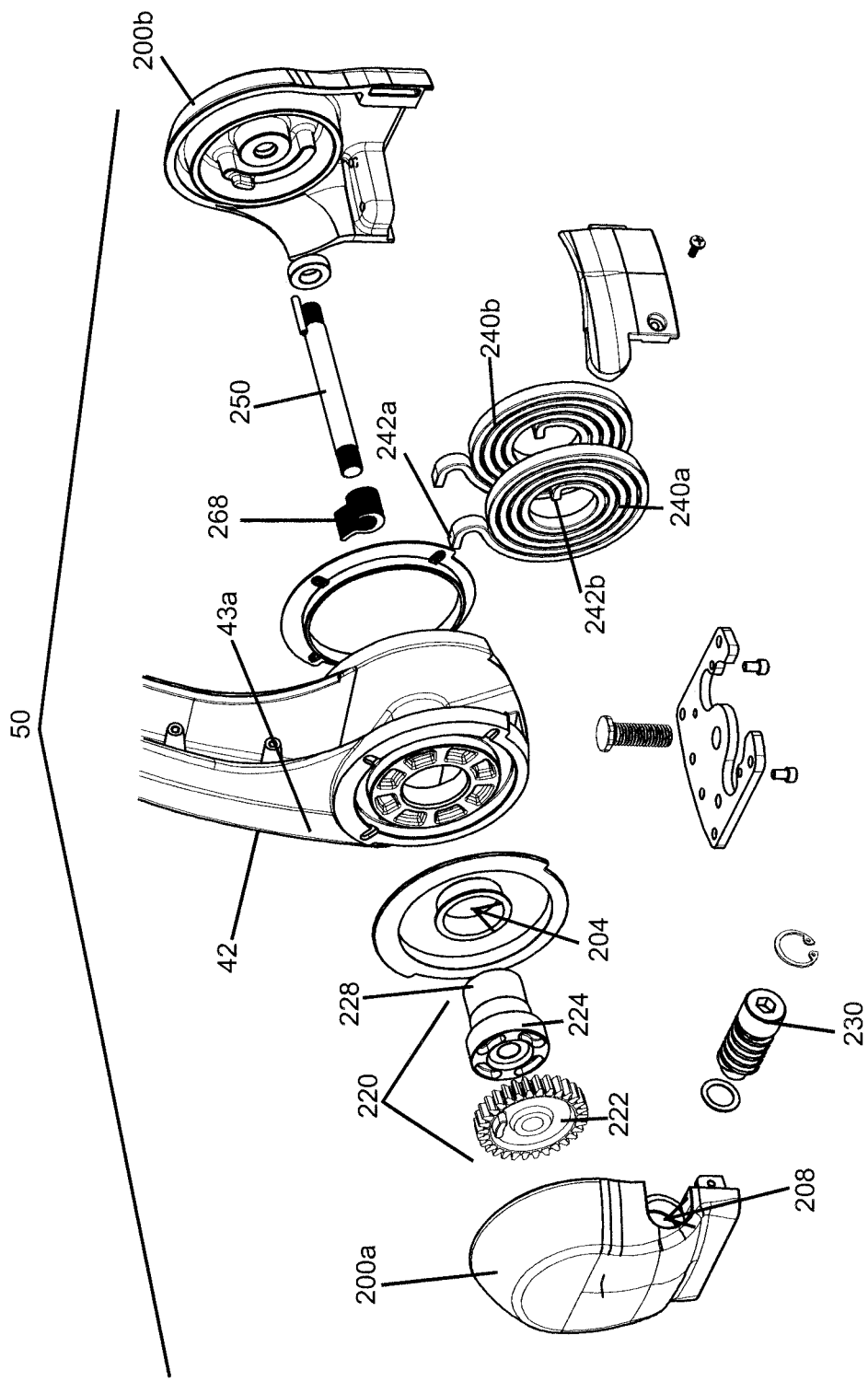
FIG. 18B is an expanded view focusing on the adjustable tilt mechanism of FIG. 18A.

At least one torque elements 158 may be coupled to and/or supported by pin 150. Torque elements 158 may be at least partially positioned within housing 100 to resist rotation of pin 150 relative to housing 100. In one embodiment, a portion of torque element(s) 158 is coupled to housing 100 to rotationally secure torque element(s) 158 about tilt axis 101 with respect to housing 100. As illustrated in FIG. 10D, inner surface 106 of tilting receptacle 104 may form groove 107, which is adapted to receive an end portion of torque element(s) 158 for rotationally securing torque element(s) 158 about tilt axis 101 with respect to housing 100. In another embodiment illustrated in FIGS. 17G, 18A, and 18B, an end portion of torque elements 268 are securely coupled to an end portion of arm 42, such that torque elements 268 produce friction with pin 250 (e.g., by contacting pin 150 or 250) to resist rotation of arm 42 around tilting axis 201.

One or more of torque elements 158 may be an asymmetrical torque element for providing an asymmetrical amount of resistance force in one rotational direction (e.g., about tilt axis 101) with respect to the other rotational direction. Additionally and/or alternatively, one or more of torque elements 158 may be a systematical torque element 158 for providing a systematical amount of resistance force, regardless of the direction of rotation.

Biasing spring 140, as illustrated in the embodiment of FIGS. 12A-12D, has a first end 142a and a second end 142b. Although biasing spring 140 is a helical torsional spring in the embodiment illustrated in FIGS. 12A-12D, the biasing spring may be another type of spring for biasing and/or providing a rotational force between two or more components of adjustable tilt mechanism 30 (e.g., adaptor 190 with respect to housing 100). In one embodiment, biasing spring 140 is a spiral spring. In another embodiment, biasing spring 140 is a torsion bar spring (e.g., a torsion bar counterbalance).

Referring to the embodiment in FIGS. 13A-13D, gear 120 has a toothed portion 122, a body portion 124, and an extension portion 126. In one embodiment, however, gear 120 is formed of one or more coupled segments (e.g., toothed portion 122 may be a separate segment that is coupled to body portion 124). Toothed portion 122 includes teeth 123 that are operatively connected to adjuster 130. Toothed portion 122 may be integrally connected to body portion 124 and/or extension portion 128.

Body portion 124 includes a passageway for receiving pin 150. The passageway may be adapted such that pin 150 radially secures gear 120 with respect to housing 100. For example, the contact between body portion 124 and outer surface 152 of pin 150 may be adapted to produce a minimal amount of friction, thereby facilitating rotation of body portion 124 while aligning a rotation axis of gear 120 with tilt axis 101, e.g., to be coaxial. Additionally and/or alternatively, body portion 124 may be configured to contact inner surface 106 of tilting receptacle 104, e.g., to radially secure gear 120 within tilting receptacle 104 of house 100. By radially securing gear 120 within tilting receptacle 104, pin 150 and/or body portion 124 facilitates operative connectivity between gear 120 and adjuster 130 and reduces/prevents disconnection. Body portion 124 may also have a side surface 126 having a holder 127 adapted to receive an end 142 of biasing spring 140.

Figure 13A:
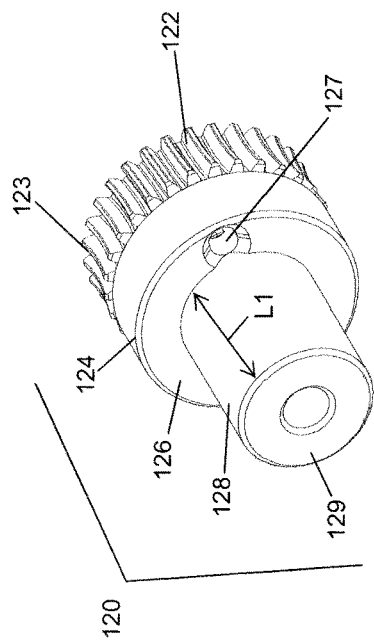
FIGS. 13A-13D are perspective, top, and side views of the gear of the adjustable tilt mechanism of FIG. 7.
Figure 13B:
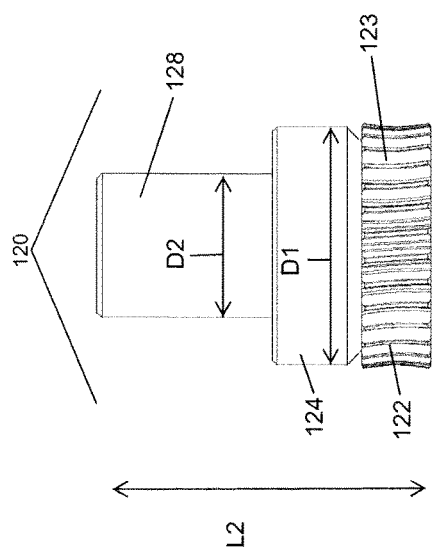
Figure 13D:
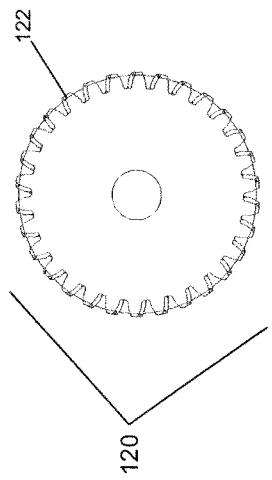
Figure 13C:
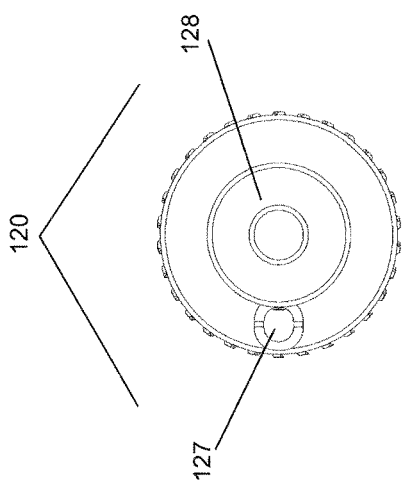

As illustrated in FIG. 13B, extension portion 126 extends from a side surface 126 of body portion 124. Although extension portion 126 and body portion 124 are illustrated in FIGS. 13A and 13B as a single integral component, in another embodiment toothed portion 122, body portion 124, and extension portion 128 of gear 120 are separable components. Extension portion 126 may have a circumference and/or diameter D2 that is smaller than a circumference and/or diameter D1 of body portion 124. Extension portion 126 may be configured to have a length L1 suitable for axially securing gear 120 within tilting receptacle 104. For example, as illustrated in FIGS. 8B and 8C, extension portion 126 may extend from body portion 124 by length L1, such that end section 129 of extension portion 126 contacts adaptor 180 upon assembly of adjustable tilt mechanism 30. In one embodiment, gear 120 has a length L2 that extends from a protrusion of internal surface 106 of tilting receptacle 104 to adaptor 180 upon assembly of adjustable tilt mechanism 30, such that gear 120 is axially secured. By axially securing gear 120 within tilting receptacle 104, extension portion 126 facilitates operative connectivity between gear 120 and adjuster 130 and reduces/prevents disconnection.

Figure 14A:
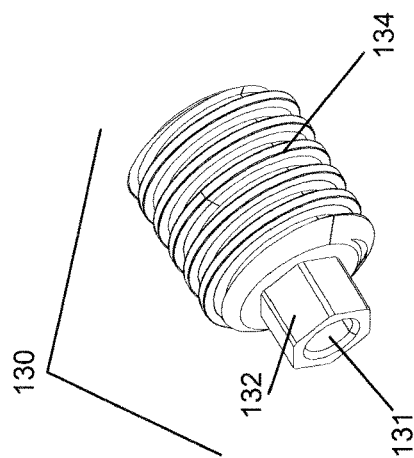
FIGS. 14A-14D are perspective, top, and side views of the adjuster of the adjustable tilt mechanism of FIG. 7.
Figure 14B:
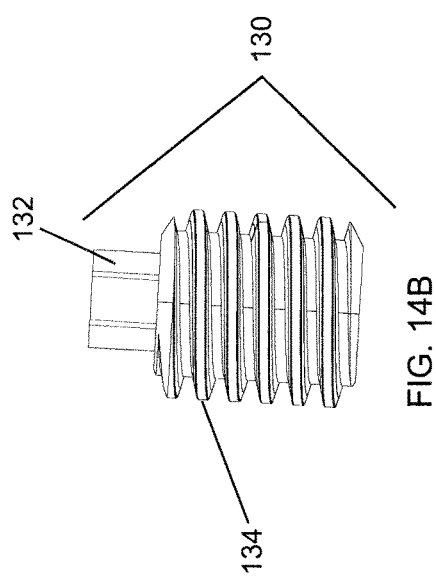

Referring to FIGS. 14A-14D, an embodiment of an adjuster 130 is illustrated. Adjuster 130 may be configured as a worm drive gear that is adapted to drive and/or rotate gear 120. Adjuster 130 includes a head 132 adapted for receiving a tool and a driving portion 134. Although head 132 is illustrated in FIG. 14A as a hexagonal protrusion, head 132 may be a protrusion forming other shapes and/or be a groove adapted for receiving a tool. In the illustrated embodiment, driving portion 134 includes threads. Preferably, the threads have a thread ratio that substantially reduces and/or prevents gear 120 from driving adjuster 130 to rotate. The thread ratio may be configured based on the contemplated maximum load applied to adjuster 130 by gear 120. In one embodiment, adjuster 130 is adapted to resist rotating under a load, applied by gear 120, of up to 12 lbs., more preferably up to 15 lbs., more preferably up to 25 lbs., more preferably up to 50 lbs., etc.

Figure 14D:
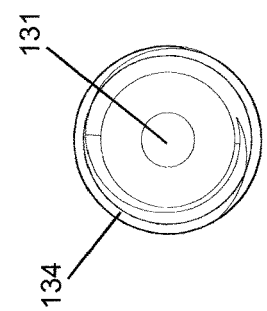
Figure 14C:
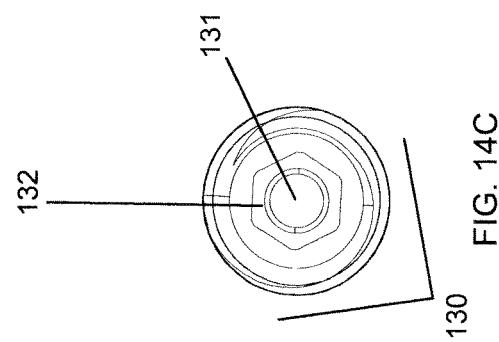

Adjuster 130 is positioned for rotation about adjustment axis 103 defined by housing 100, e.g., within adjustment receptacle 108. Preferably, adjuster 130 is axially and radially secured within adjustment receptacle 108. For example, adjuster 130 may be axially secured between an internal wall of housing 100 and/or the terminal end 138 of adjustment receptacle 108 and a retainer 136. Alternatively, adjuster 130 may be axially secured between two or more retainers, e.g., in an embodiment having an adjustment receptacle that extends from a top surface 112a to a bottom surface 112b of housing 100. Retainer 136 may have an aperture 137 for receiving head 132 and/or a tool. As illustrated in FIGS. 14C and 14D, adjuster 130 has a passageway 131 extending there through.

Adjuster 130 is operatively coupled to gear 120 through aperture 109 extending from adjustment receptacle 108 to tilting receptacle 104. Driving portion 134 of adjuster 130 and/or toothed portion 122 of gear 120 may be at least partially disposed within aperture 109 to operatively couple adjuster 130 and gear 120. Adjuster 130 and gear 120 may operate as a worm gear assembly, whereby adjuster 130 rotates about adjustment axis 103 to drive gear 120 to rotate about tilt axis 101.

As adjuster 130 drives gear 120 to rotate, the load applied by biasing spring 140 may be increased and/or decreased. For example, biasing spring 140 may have a first end 142a affixed to adaptor 180 and a second end affixed to gear 120, such that rotation of gear 120 relative to adaptor 180 increases or decreases the amount of winding of biasing spring 140. In the embodiment illustrated in FIG. 8C, one end 142 of biasing spring 142 is received within holder 127 of side surface 126 of gear 120, while the other end is received within holder 183 of inner surface 182 of adaptor 180. Preferably, the load applied by biasing spring 140 may be adjusted from a minimum value of 1 lb., more preferably from 5 lbs., or more preferably from 12 lbs. Also, preferably, the load applied by biasing spring 140 may be adjusted from a maximum value of 50 lbs., or more preferably from 15 lbs. Nevertheless, the load applied by biasing spring 140 can be selected to be any value, including values below 1 lb. and maximum values above 50 lbs. The load applied by biasing spring 140 is preferably applied as a torsional force for rotating and/or resisting rotation of adaptor 180 and/or pin 150 with respect to housing 100 about tilting axis 101. Adjustable tilting mechanism 30, and torque adjustment assembly 118, advantageously allows the load applied by biasing spring 140 to be adjusted after adjustable tilt mechanism 30, arm assembly 20, or cart 10, is completely assembled.

FIGS. 16A-18B illustrate another non-limiting embodiment of an arm assembly 40 having an adjustable tilt mechanism 50. Although arm assembly 40 and adjustable tilt mechanism 50 are similar to arm assembly 20 and tilt mechanism 30, arm assembly 40 and adjustable tilt mechanism 50 include the differences disclosed herein and illustrated in the corresponding figures. Accordingly various specifics of arm assembly 40 and adjustable tilt mechanism 50 may be omitted when similar to arm assembly 20 and tilt mechanism 30.

Referring to FIGS. 16A-17J, arm assembly 40 includes an arm 42 having a first end portion 43a coupled to a base 46 and a second end portion 43b coupled to a mounting plate 48. Arm 42 may be coupled to base 46 and/or mounting plate 48 by way of adjustable tilt mechanism 50. For example, in the embodiment illustrated in FIG. 16A, arm 42 is coupled at first end portion 43a to base 46 at least by adjustable tilt mechanism 50 and coupled at second end portion 43b to mounting plate 48 at least by joint portion 44. In another embodiment, however, arm 42 is coupled at first end portion 43a to a first adjustable tilt mechanism 50 and coupled at second end portion 43b to a second adjustable tilt mechanism 50. Base 46 may be adapted for coupling to a wall, a table, or any other support. Mounting plate 48 may be adapted for coupling to a display, monitor, or any other object.

Adjustable tilt mechanism 50 includes a housing 200 defining a tilt axis 201 and an adjustment axis 203. Housing 200 may be formed from one or more housing shells 200a and 200b and/or first end portion 43a of arm 42. Similar to adjustable tilt mechanism 30, adjustment axis 203 may be oriented substantially perpendicular and non-intersecting relative to tilt axis 201. Tilt axis 201 may extend through a tilt receptacle 204 defined by one or more surfaces of housing shells 200a and/or 200b and/or by one or more components of first end portion 43a of arm 42. Although tilt receptacle 204 extends into both housing shells 200a and 200b as well as through several components of first end portion 43a of arm 42 in the embodiment illustrated in FIG. 18B, tilt receptacle 204 may be configured to extend into only a portion of housing 200 and/or first arm portion 43a of arm 42. Adjustment axis 203 may extend through an adjustment receptacle 208 defined by one or more surfaces of housing shells 200a and/or 200b. In one embodiment, however, adjuster 230 and receptacle 208 are disposed solely within first end portion 43a of arm 42.

Adjustable tilt mechanism 50, similar to adjustable tilt mechanism 30, includes an adjuster 230 that drives gear 220 to rotate (e.g., tooth portion 222, body portion 224, and extension portion 228). As gear 220 rotates, the amount of winding of biasing springs 240 may be increased or decreased. For example, biasing spring 240 may have a first end 242a affixed to first end portion 43a of arm 42 and a second end 242b affixed to extension portion 228 of gear 220, such that rotation of gear 220 increases or decreases the load applied by biasing spring 240 (e.g., biasing springs 240a and/or 240b) to first end portion 43a of arm 42. Although first end 242a of biasing springs 240 is coupled and/or attached to protrusion 45 of first end portion 43a of arm 42 and second end 242b of biasing springs 240 is secured within a holder 227 defined by a surface of extension portion 228 of gear 220 in the embodiment illustrated in FIG. 16F, ends 242 of biasing spring 240 may be coupled to first end portion 43a of arm 42 and extension portion 228 of gear 220 by mechanical means, such as screws, clamps, welding, etc., or by non-mechanical means, such as adhesives, etc. Additional and/or alternatively, the load applied by biasing springs 240 may be applied as a torsional force for rotating and/or resisting rotation of arm 42 and/or pin 250 with respect to housing 200 about tilting axis 201.

Although the invention is illustrated and described herein with reference to specific embodiments, the invention is not intended to be limited to the details shown. Rather, various modifications may be made in the details within the scope and range of equivalents of the claims and without departing from the invention.

What is claimed is:
1. An adjustable tilt mechanism comprising:
    a housing defining a tilt axis and an adjustment axis oriented perpendicular and non-intersecting relative to the tilt axis, the housing being configured to be indirectly coupled to at least one object;

a torque adjustment assembly at least partially disposed within the housing, the torque adjustment assembly including an adjuster positioned for rotation about the adjustment axis defined by the housing, a gear positioned for rotation about the tilt axis defined by the housing, a biasing spring having one end coupled to the gear and another end that is configured to be coupled to an arm for supporting the at least one object, the gear being operatively coupled to the adjuster, such that rotation of the adjuster rotates the gear and adjusts a torque load applied by the biasing spring onto the arm, a pin positioned at least partially within the housing and supporting the gear; and at least one torque element positioned at least partially within the housing, the at least one torque element coupled to the pin.

2. The adjustable tilt mechanism of claim 1, further comprising a mounting plate for attachment to at least one object.

3. The adjustable tilt mechanism of claim 1, wherein the tilt axis is substantially horizontally oriented.

4. The adjustable tilt mechanism of claim 3, wherein the rotation receptacle extends through the housing.

5. The adjustable tilt mechanism of claim 1, wherein the housing further defines a rotation receptacle extending along a rotation axis.

6. The adjustable tilt mechanism of claim 1, wherein the pin and/or the housing supports the gear.

7. The adjustable tilt mechanism of claim 1, wherein the at least one torque element includes an asymmetrical torque element for providing an asymmetrical amount of resistance force in one rotational direction with respect to the other rotational direction.

8. The adjustable tilt mechanism of claim 1, wherein the biasing spring is a helical spring or a spiral spring.

9. The adjustable tilt mechanism of claim 1, wherein the biasing spring is a torsion bar spring.

10. The adjustable tilt mechanism of claim 1, wherein the at least one object includes at least one user interface device.

11. The adjustable tilt mechanism of claim 10, wherein the at least one user interface device includes at least one display.

12. The adjustable tilt mechanism of claim 1, wherein the at least one object comprises a base.

13. The adjustable tilt mechanism of claim 1, wherein the pin is rotationally secured to the housing and is prevented from rotating with respect to the housing.

14. The adjustable tilt mechanism of claim 1, wherein the at least one torque element is positioned about the pin and one end of the torque element is configured to be mounted to the arm to resist rotation of the arm about the tilting axis.

* * * * *